2,887,634
MOLDED POLYSTYRENE CAPACITOR

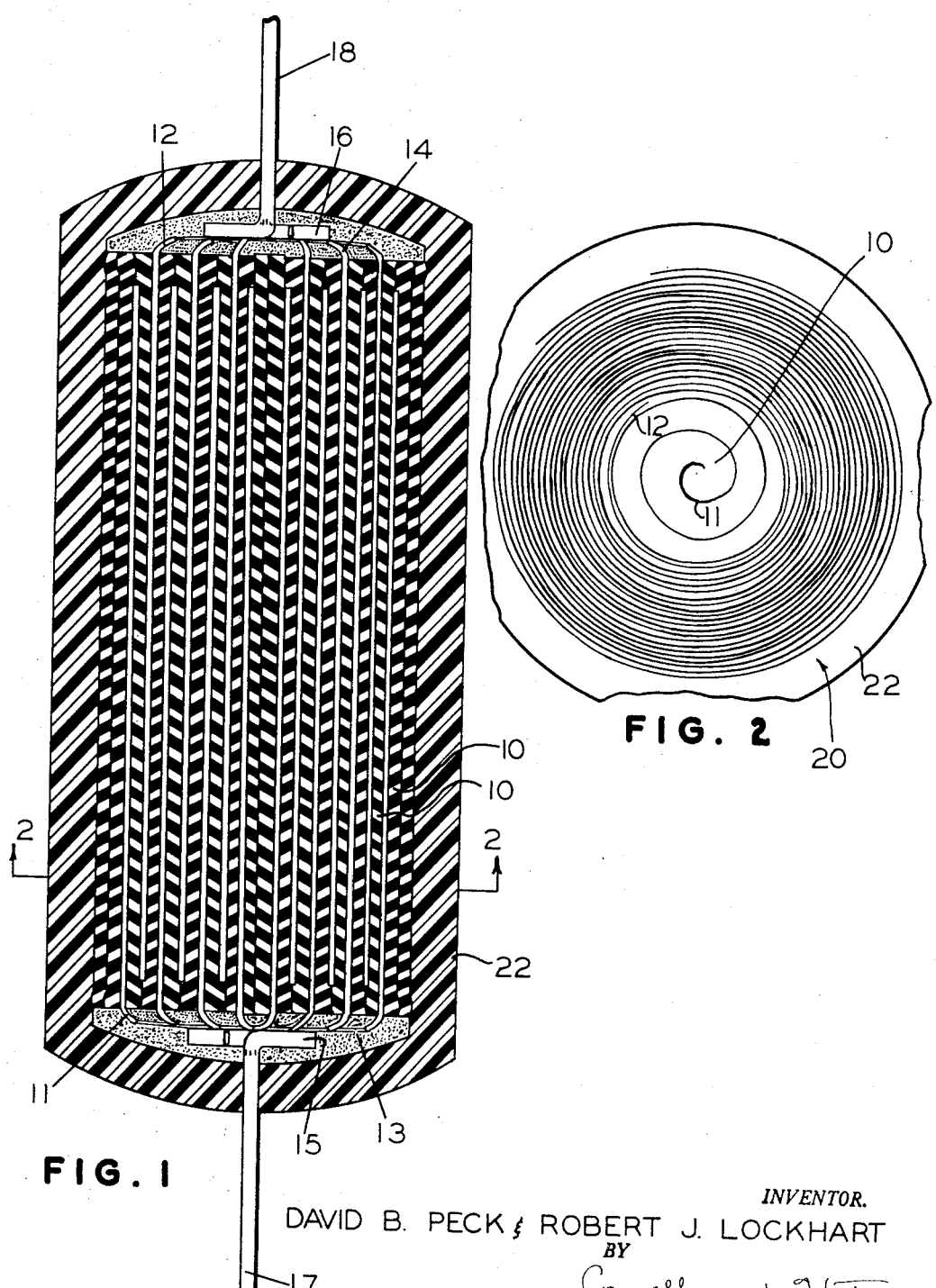

David B. Peck and Robert J. Lockhart, Williamstown, Mass., assignors to Sprague Electric Company, North Adams, Mass., a corporation of Massachusetts Application May 3, 1954, Serial No. 427,086

2 Claims. (Cl. 317—258)

This invention refers to improved electrical capacitors and more specifically refers to molded film capacitors, characterized by very high insulation resistance and/or capacitance stability, suitable for operation at elevated temperatures.

Electrical capacitors are of many types, each of which is characterized by some particular property or properties which leads to its use in certain types of electrical circuit applications. There are, however, a number of circuit requirements to which the existing type of capacitors are unsuited or are of an expensive nature. One such requirement is a unit with low and essentially linear temperature coefficient of capacity and another is for extremely high insulation resistance and low dielectric absorption at normal and elevated temperatures. For the first requirement, the mica capacitor employing imported mica, has previously been used, being for practical purposes limited to low capacity values and subject to variations in characteristics resulting from the unavoidable variations of the mica which is a naturally occurring mineral. For higher capacitance values, polystyrene capacitors have met some application requirements of a reasonably low temperature coefficient of capacity and high insulation resistance, but ordinarily have been limited to an operational temperature no higher than 65° C.

It is an object of this invention to overcome the foregoing and related disadvantages. A further object is to produce new and useful molded electrical capacitors. A still further object is to produce capacitors characterized by low temperature coefficients of capacity combined with high insulation resistance and high Q over a wide temperature range. A still further object is to produce molded capacitors capable of operation at high voltages and temperatures without substantial deterioration of the dielectric material or change in capacitor characteristics. Additional objects will become apparent from the following description and appended claims.

These objects are attained in accordance with the present invention by the production of an electrical capacitor comprising a condenser section composed of convolutely wound plastic metal electrode foils separated by a dielectric material consisting of a partially disoriented polyvinyl aromatic hydrocarbon resin, said section completely encased in and maintained under compression by a thermoset resin.

In a more restricted sense this invention is concerned with an electrical capacitor operable for extended periods at temperatures up to 125° C. comprising an essentially cylindrical capacitor section composed of convolutely wound plastic metal electrode foils separated by a dielectric material consisting of a partially disoriented polystyrene film having a transition temperature below 100° C., said section compressively encased in a pressure molded casing of a thermoset resin.

In its preferred embodiment the invention is concerned with an electrical capacitor comprising a capacitive section composed of convolutely wound lead foil electrodes separated by a partially disoriented polystyrene film, said section compressively encased in a thermoset resin molded at a temperature substantially above the transition point of said polystyrene film.

In the Schupp et al. United States Letters Patent 2,177,266, an electrical capacitor with a dielectric of polystyrene is discussed. The electrodes of the capacitor are separated by a dielectric of polystyrene in a contracted state which has been brought about by carefully heating the wound assembly for a period slightly above the transition point of the oriented polystyrene film so as to fuse the dielectric material against the electrodes and thus avoid the presence of voids within the assembly. Such a device is inherently limited in operation to temperatures which are substantially below the transition point of the dielectric, for example, if used at a temperature of 100° C. the dielectric continues to flow so as to bring about short-circuiting of the electrodes. Since Schupp et al. issued there has been much activity to produce dielectric films having the electrical characteristics of polystyrene but lacking the deficiency of thermal flow at relatively low temperatures. All of this activity has been brought about because polystyrene in spite of its excellent electrical properties had not been adapted to operational temperatures in excess of 65° C. Modification of the polystyrene has been achieved to yield somewhat higher softening or transition points, but still the resultant materials do not possess those characteristics which make possible operation at temperatures at 85° C. and higher.

Although it is not fully understood, it has been found that polystyrene can be used as a dielectric of a capacitor operable for extended periods at 125° C. This has been accomplished by convolutely winding plastic metal electrodes with polystyrene film having a high degree of orientation (softening point of about 82 to 85° C.), subjecting this wound assembly to a temperature above the transition point for a short period, and thereafter compressively molding the shrunk assembly in a thermoset resin having curing temperature in excess of 100° C. It is even more remarkable that this molded unit resulting has electrical characteristics equal to and superior to that of the conventional mica capacitors with a much higher degree of capacity per unit volume.

The above will be explained with reference to the accompanying drawings wherein:

Fig. 1 is a sectional view of a capacitor embodying the present invention; and

Fig. 2 is a sectional view of the capacitor of Fig. 1, taken along the line 2—2.

The dielectric materials falling within the scope of this invention are oriented polyvinyls having a transition point substantially below the temperature at which the molding operation is conducted. It includes polyvinyl toluene, polystyrene, polystyrene cross-linked with a minor amount of bifunctional compound such as divinyl and trivinyl benzene, butadiene-styrene copolymers, and other thermoplastic styrene-containing dielectric resins which can be oriented to a substantial degree. A typical dielectric film is oriented polystyrene having a widthwise softening point of 93° C. For purposes of definition, the resin softening point of a film is that temperature at which the width or length suffers a 1% change in dimension when held under a very slight tension. The above typical polystyrene film exhibited 85% of its original width at 99° C. and 70% of its original width at 101° C. A relation between the softening point of the thermoplastic film and the temperature of processing must be maintained so as to obtain partial disorientation prior to molding of the device. For best results, the change of dimension should be such that the film is from 70 to 95% of its original dimension at the tetmperature at which initial shrinking of the assembly is caused. Non-oriented cast films must undergo orientation in at least one direction prior to winding with the electrodes.

This invention contemplates only the use of flexible metal foil electrodes such as aluminum, zinc, copper, lead, tin and combinations thereof. Conventional thicknesses of electrodes are used, ranging from 0.25 mil to 1 mil. In the course of the discovery of this invention it was found that the composition of the foil has a positive impact on the electrical characteristics of the unit. For the preferred construction a plastic metal electrode foil is used, in order to yield a component having minimum temperature coefficient of capacity and minimum variation of capacity upon recurrent cycling over a temperature range of 25° C. to 85° C. By plastic electrode metals, we mean materials having a tensile strength of less than about 8000 pounds per square inch. Lead and tin alloys of these materials are preferred. When it is desired to use aluminum as the electrode a modification (to be later discussed) in the process is required to yield a more stable component.

The insulation material imposed about the capacitor section as a casing is of the thermoset resin type either filled or unfilled. After the capacitor unit has been rolled and thermally processed, a thermoset resin such as phenol formaldehyde is molded completely about the capacitor with only the terminal wires extending therethrough. The molding technique used can be of any of the conventional types, that is compression, injection or transfer, although the compression molding technique is preferred. Temperatures in excess of 100° C. are employed. A typical molding is carried out at 129° C. for two minutes at 3000 pounds per square inch. Included among these thermoset resins are phenol formaldehyde, urea formaldehyde, urea melamine, alkyds such as the product of phthalic anhydride and glycerol, compression molded silicone and epoxy types. As explained above, the insulation resistance of this molded capacitor is extremely high, and with the preferred construction of polystyrene as the dielectric and lead foil as the electrodes, a slightly negative temperature coefficient of capacitance as well as a negative temperature coefficient of insulation resistance is available.

A further embodiment of this invention involves the use of molding compounds containing small amounts of conducting filler (an epoxy resin having 10% to 30% of carbon particles) whose temperature coefficient of mass conductivity in the final molded state is positive and of such magnitude that it compensates for the normally negative temperature coefficient of insulation resistance. This feature is of value in time constant circuits.

An additional embodiment of the invention involves the use of high energy cross-linking of the dielectric of the capacitor after molding, thus converting the dielectric into an even more temperature stable form. For example, a molded polystyrene capacitor is exposed to a source of neutrons or high energy gamma particles.

Referring now to Fig. 1 the condenser section here shown comprises dielectric films 10, 10 convolutely wound with electrode foils 11 and 12, the film being finally wound several times about the rolled section. The edges of the foils 11 and 12 extend from opposite sides of the dielectric film 10, in accordance with the conventional non-inductive construction, and are joined by means of solder 13 and 14 to the spiralled segments 15 and 16, respectively, of lead-wires 17 and 18 in a manner well-known to the art. Although this termination is the preferred construction, this invention is susceptible to several other modifications with respect to termination. Where the non-inductive section is not used, tabs may be laid in on the respective electrodes or flag leads could also be used. A further method of termination would be to lay a flattened wire against the individual electrode, which flattened wire forms a portion of the external terminal lead wire. In winding the condenser section it is conventional to employ a winding mandrel about which the dielectric and foil are wound. If desired, the terminal lead wire could extend all of the way into the mandrel hole of a non-inductively wound section with soldered connection of the extended foil to the respective terminal lead wire. The mandrel may vary in size over a wide range or may be as small in diameter as 1/32", although larger diameters up to 3/32" are more readily employed. In any event, a space will be present in any wound condenser when the condenser is removed from the mandrel. For mandrel holes left by mandrels having a diameter of 3/32" or smaller this space remaining appears to be substantially completely filled by the disorientation of the dielectric film and the resulting shrinking of the assembly by exposure to a temperature slightly above the transition temperature of the dielectric for a short interval of time. After shrinkage, i.e. partial disorientation of the linearly dielectric film, the spiralled terminal wires are soldered to their respective foils, each of which is exposed beyond the edge of the film. Where a mandrel is used having a diameter in excess of 3/32", it is necessary to insert a rigid dielectric insert such as a glass rod into the section prior to shrinkage in the space previously occupied by the mandrel so as to avoid the occurrence of voids within the shrunken unit. The presence of such voids manifest themselves with reduced temperature stability and lowered breakdown voltage. Where it is desired to impregnate the assembly with a dielectric fluid, it is necessary to impregnate the unit prior to the shrinkage.

The above is pictorially represented in Fig. 2. The condenser section 20 which has extra turns of the resinous film on its outer cylindrical surface is encased in the molded casing 22. Casing 22 appears to adhere to an unusual extent to the resin film 10 although the materials are in no way homologous. The casing 22, it will be noted, compresses upon the condenser section 20 as well as the terminal wires at all temperatures below its molding temperature. For some particular applications the resin casings enclosing the condenser section may be impregnated with a mineral wax having a melting point of about 90° C. or higher. It should be understood, however, that this, the above impregnation, is not necessary to fabricate the article of the invention but forms a limited embodiment thereof.

The following example will serve to illustrate the process of the capacitors in accordance with this invention. A 1000 mmfd. capacitor was produced by rolling two layers of 1 mil polystyrene between lead foils of 0.4 mil thickness and 1" width. The polystyrene film had a widthwise softening point of 93° C. The rolled section provided with tinned copper terminal wires as shown in Fig. 1 by soldering with 60-40 lead-tin solder melting at 185° C., and thereafter subjected to heat so as to partially disorient the highly oriented polystyrene film. For a polystyrene film having a sideways shrinkage of from 70 to 95% of its original dimension at 100° C. such temperature for one hour causes suitable contraction. As is well-known, polystyrene varies substantially from lot to lot obtained from the manufacturer, particularly in the degree of orientation. This degree of orientation manifests itself in variations of softening point and degree of shrinking of the oriented film at a given temperature. It is preferred to conduct the shrinking step of the process at a temperature of from 5 to 10° C. above its softening point, such temperature effecting shrinking of an unsupported or lightly supported film of from 5% to 30% the original width. Although a generally useful time of shrinking of the section with lead foil is for 1 hour at 100° C., where aluminum is used as the electrode a longer time, from 5 to 15 hours at this same temperature, is desirable for optimum stability of capacity.

After the contraction of the dielectric has been accomplished, the units are molded with conventional techniques, for example, a mineral filled alkyd resin casing was molded about a contracted unit by applying a pressure of 4 tons per square inch for 1½ min. at 126° C. The resulting unit in addition to being durable and moisture resistant had an ultimate dielectric strength far in excess of 3500 volts/mil, a dissipation factor of less than .05% through 85° C.; insulation resistance in excess of 10,000,000 megohms at room temperature and life in excess of 250 hours at 125° C. under 600 v. D.C. imposed operational voltage. This extended operation at 125° C. may further disorient the dielectric, but surprisingly enough the electrodes maintain their original spacing relative to each other. Q values in excess of 2000 are noted for such units at one megacycle. At 85° C. continuous service at 1500 volts D.C. did not cause any failures in a group of 12 units tested for over 1500 hours. Capacity change during this test was less than 1.5% in all units.

The units produced in accordance with this invention are remarkable in that they use a dielectric material having a softening point substantially below that of 100° C. and yet are molded at a temperature well in excess of 100° C. and are thereafter operable at temperatures up to 125° C. and higher with substantial imposed voltage stress. Their capacitance drift and temperature coefficient are very small with extremely high Q and insulation resistance. The power factor is quite low and the dielectric stress which one can impose upon such units is quite high. Furthermore, with the molded casing the units can withstand the onslaught of excessive humidity even at elevated temperatures. Their electrical characteristics are equal to or superior to those of the mica type capacitors and further offer a system which is more economical to produce than the previously known mica type, particularly in higher capacity values. Coupled with the eletrical and economic advantages of such a system is the miniaturization or much increased capacity per unit volume available with such devices. The cross-linked polystyrene capacitors can be operated at temperatures as high as 200° C. for limited periods of time.

As many apparently widely different embodiments of this invention may be made without departing from the spirit and scope hereof, it is to be understood that the invention is not limited to the specific embodiments hereof except as defined in the appended claims.

What is claimed is:

1. An electrical capacitor comprising a shunken condenser section composed of convolutely wound electrode foils separated by and wrapped within the layers of a dielectric material consisting of a partially disoriented polyvinyl aromatic hydrocarbon resin, said section being completely encased in and maintained under compression by a thermoset resin having a molding temperature higher than the shrinkage temperature of the section.

2. An electrical capacitor operable for extended periods at temperatures up to 125° C. comprising an essentially cylindrical capacitor shrunken section composed of convolutely wound plastic metal electrode foils separated and encased by a dielectric material consisting of a partially disoriented polystyrene film having a transition temperature below 100° C., said section being compressively encased in a pressure molded casing of a thermoset resin having a molding temperature higher than 100° C.

References Cited in the file of this patent

UNITED STATES PATENTS

| 2,177,266 | Schupp | Oct. 24, 1939 |
| 2,442,810 | Haas | June 8, 1948 |
| 2,559,141 | Williams | July 3, 1951 |
| 2,634,315 | Allison | Apr. 7, 1953 |
| 2,713,700 | Fisher | July 26, 1955 |

FOREIGN PATENTS

| 642,609 | Britain | Sept. 6, 1950 |

OTHER REFERENCES

"Vinyl and Related Polymers," by Schildknecht, published by John Wiley and Sons, February 20, 1952, pp. 42.